Jan. 26, 1960    A. J. BUCHI    2,922,569
MEANS FOR LUBRICATING AND COOLING A TURBINE-DRIVEN COMPRESSOR
Filed April 8, 1957
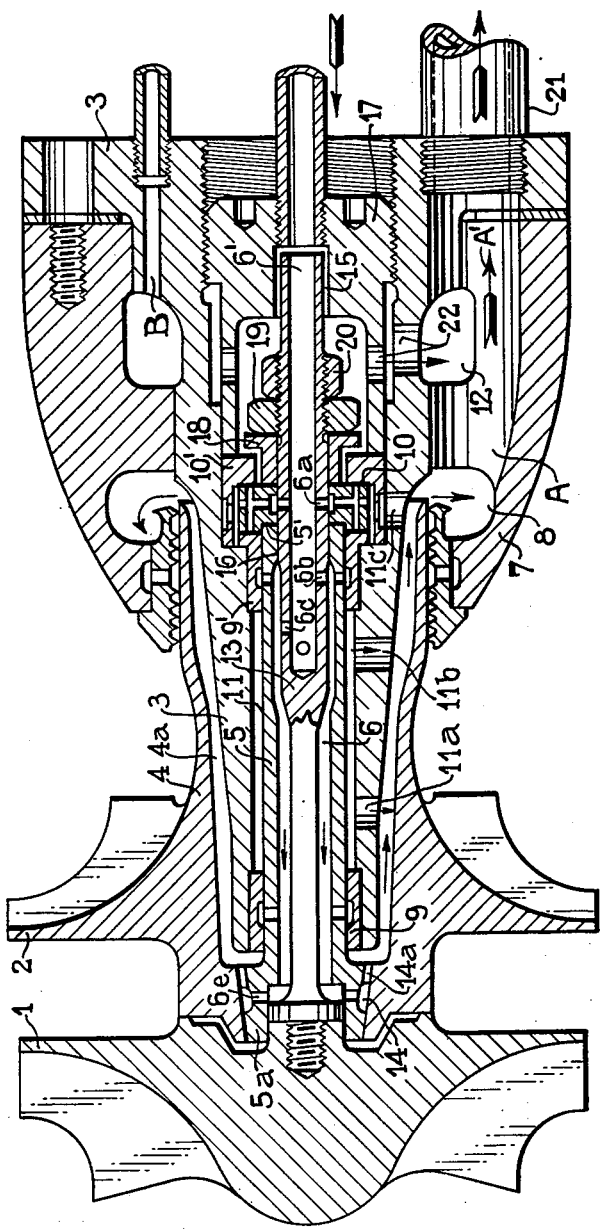
Inventor
A. J. Buchi
By Glascock Downing Seebold
Attys.

United States Patent Office 2,922,569
Patented Jan. 26, 1960

2,922,569

MEANS FOR LUBRICATING AND COOLING A TURBINE-DRIVEN COMPRESSOR

Alfred J. Buchi, Winterthur, Switzerland

Application April 8, 1957, Serial No. 651,216

Claims priority, application Switzerland April 14, 1956

3 Claims. (Cl. 230—116)

The present invention concerns means for lubricating and cooling a turbine-driven compressor wherein the turbine rotor is carried for rotation by a fixed mounting which extends at least in part into the hub portion of the compressor rotor. The invention resides in that there is provided a lubricant supply channel in at least a part of the length of a shaft which supports the two rotors, which shaft is connected to the turbine and compressor rotors through a support member, radial distribution passages conveying lubricant from within the shaft outwards to the supply points. In addition to the distribution passages which serve for the supply of lubricant to bearing points of the shaft, there is provided at least one lubricant supply channel to carry cooling oil to the support member between the turbine and compressor rotors. The part of the oil supply which serves for cooling as well as the oil which serves to lubricate the shaft bearings is delivered in common to the interior of the compressor hub and thence flows into an annular chamber situated in a fixed housing from which housing the lubricant is discharged exteriorly. The discharge of the oil to the exterior may be so effected that a part of the oil supply coming from the inner of a pair of axially spaced bearings and a part of the oil coming from the outer of said pair of bearings as well as a part of the oil from a shaft thrust bearing are fed through separate delivery apertures formed in the fixed mounting and passed into the interior of the compressor hub, the oil being delivered therefrom to the annular chamber situated within said housing and being discharged from said annular chamber into an outwardly opening chamber in the housing. In a preferred constructional form, there may be provided within the shaft which supports the rotors a cylindrical member connected to the turbine rotor and projecting outwardly therefrom to beyond the supporting shaft, said member serving for axially holding the rotors together, the cylindrical member having a central channel which forms at least a part of the central oil channel. The cylindrical member may be supported internally by the shaft at a point intermediate its length and adjacent the thrust bearing so that the support region serves as a centering point. There may be provided from this point in the direction of the rotors a free space between said member and the bore of the support shaft which space forms a part of the oil supply channel in which event the channel in the cylindrical member communicates with said free space through radial distribution passages. The support member which is arranged between the turbine and compressor rotors may comprise a peripheral cooling chamber and drainage ducts for conveying cooling medium away from the chamber, the drainage ducts having such a cross-sectional area that while ensuring adequate cooling of the support member they ensure a sufficient pressure for lubrication of the bearings under all operating conditions, the drainage ducts leading into the interior of the compressor hub. Oil in excess of requirement being supplied to the central oil channel is arranged to flow away directly into drainage channels formed in the fixed housing.

A practical application of the present invention will now be described, by way of example only, with reference to the accompanying drawing which illustrates means for lubricating and cooling a turbine-compressor assembly in accordance with the present invention, the assembly being shown in axial section.

Referring to the drawing: the turbine rotor is indicated by the reference numeral 1 and the compressor impeller at 2. The turbine-compressor assembly is supported on a fixed mounting, generally indicated at 3, which mounting extends in part into the hub portion 4 of the compressor impeller. The rotor 1 and the impeller 2 are both mounted on a common member 5a of a shaft 5 which is supported in bearings as later described. A space 4a is defined between the hub portion 4 of the impeller 2 and the mounting 3. The mounting 3 is secured to a housing 7 as later described.

The shaft 5 is of tubular construction to provide a channel 6 and within the shaft 5 there is mounted a tension member 13 one end of which is secured to the turbine rotor 1 as shown in the drawing. The other end of the member 13 is formed with an oil supply channel 6' and radial passages 6b and 6c place the channel 6' in communication with the channel 6 so that oil under pressure delivered to the end of the channel 6' finds its way into the channel 6.

Radial distribution passages 6a place the channel 6' also in communication with the thrust bearing 10, 10' while, as shown in the drawing, the tubular shaft 5 is provided with radial distribution passages which supply lubricant to the axially-spaced inner and outer radial bearings 9 and 9' respectively, which bearings are provided to support the shaft 5 from the member 3. All the distribution passages supply the bearings in an outward direction.

The member 5a of the tubular shaft 5 which supports the turbine rotor and compressor impeller is formed with passages 6e which place the channel 6 in communication with the space 4a. Accordingly oil under pressure delivered to the channel 6 passes through the passages 6a and thence to the space 4a and in circulating through the member 5a the oil cools the latter. It will be appreciated that the member 5a is subjected to the greatest heat from the turbine rotor.

Lubricating oil in excess of requirements flowing from the bearings 9, 9' is thrown radially outwardly under centrifugal action from the outer surface 11 of the tubular shaft 5 and is discharged through the ports 11a and 11b into the space 4a and thence into an annular chamber 8 formed in the housing 7. Since the oil for cooling the member 5a is also discharged into the space 4a this oil finds its way into the annular chamber 8 and the oil collecting therein passes into the chamber A in the housing 7 and is discharged therefrom in the direction of the arrow A' into a drain-pipe 21.

It will be observed from the drawing that the radial passages 6e communicate with a peripheral cooling chamber 14 formed in the member 5a and that channels 14a place chamber 14 in communication with the space 4a. It is arranged that the cross-sectional area of the passages 14a is such that although they provide for an adequate circulation of oil through the member 5a so as to maintain it relatively cool nevertheless the oil pressure within the tubular shaft 5 is sufficiently high to ensure adequate lubrication of the bearings referred to under all operating conditions.

The tension member 13 is of cylindrical form and extends outwardly beyond the tubular shaft and the bearing 10 and the member 13 engages the inner surface of the tubular shaft 5 near the bearing 10, at the region 16, so that the member 13 intermediate its length is supported by the tubular shaft.

The bearing ring 10 abuts the end face 5' of the tubular shaft 5 and a sleeve 18 is mounted on member 13 and engages the other side of the ring 10 to the tubular shaft. The member 13 is threaded to receive a clamping nut 19 and a lock nut 20. As stated above the end of the member 13 is secured to the rotor of the turbine 1 and when the clamping nut 19 is drawn up the impeller of the compressor 2 and the rotor of the turbine 1 are pulled together axially and the ring 10 is pressed against shaft 5 to prevent rotation of the ring. It will be appreciated therefore that the member 13 serves as a central channel conveying oil to the various parts as described above and also as a tie member to hold the turbine and compressor axially assembled. Instead of the oil channel 6' extending only part way of the member 13 it could extend over the entire length thereof.

The bearing 10 comprises the member which is clamped between the end 5' of shaft 5 and sleeve 18 and also the member 10'. The latter is held in position secured to the member 3 by the screw cap 17. Oil is supplied under pressure through a pipe to the interior of the screw cap 17 and it will be observed that the end of the tension member 13 is spaced, at 15, from the screw cap 17. Oil supplied in excess of requirements is thereby enabled to leak along the passage 15 and to pass through the apertures 22 formed in the screw cap 17 and in the wall of member 3 and thence into the chamber A and the drain-pipe 21.

It is to be understood that the chamber A is towards the bottom portion of the housing 7. The chamber A also communicates with an annular chamber 12 and there is an air discharge duct B near the top of the chamber 12. The chamber A reduces the weight of the housing 7 and of the member 3 besides serving to collect oil and to place the various passages in communication with air vent B.

What I claim is:

1. A turbine-driven compressor comprising a turbine rotor, a compressor rotor, said compressor rotor having a hub portion, a fixed mounting extending at least partially into the hub portion of the compressor rotor and about which mounting said rotors rotate, a single tubular shaft extending coaxially of said fixed mounting, a support member on said shaft to which said rotors are mounted for rotation, said turbine rotor including a central prolongation extending through the tubular shaft, said central prolongation having a solid portion adjacent the turbine rotor and a tubular portion of greater diameter at its end remote from the turbine rotor with such tubular portion extending partly within said tubular shaft, means supporting the tubular portion of the central prolongation from the inner periphery of the tubular shaft whereby a central annular channel is provided between the central prolongation and the inner periphery of said tubular shaft, and said tubular portion being provided with a passageway connecting such tubular portion with said annular channel so that said tubular portion and annular channel jointly provide a main lubricating and cooling oil supply passage.

2. A turbine-driven compressor as claimed in claim 1, further including thrust bearing means for said tubular shaft adjacent the end of the central prolongation remote from the turbine rotor, said tubular portion having radial passage means for supplying lubricating oil to the thrust bearing and further radial passage means in said fixed mounting for discharging the lubricating oil from the thrust bearing.

3. A turbine-driven compressor as claimed in claim 1, in which said support member is provided with an annular oil channel communicating with said main lubricating and cooling oil passage, said support member being provided with axially disposed oil discharge passages communicating with said annular channel and the cross-sectional areas of such discharge passages being so selected that there is ensured for the lubrication of the shaft bearings a sufficient oil pressure in the main lubricating and cooling oil passage under all operating conditions.

References Cited in the file of this patent

UNITED STATES PATENTS

| Re. 23,172 | Buchi | Nov. 29, 1949 |
| 2,159,422 | Buchi | May 23, 1939 |
| 2,184,197 | Schutte | Dec. 19, 1939 |
| 2,322,824 | Buchi | June 29, 1943 |
| 2,480,095 | Buchi | Aug. 23, 1949 |

FOREIGN PATENTS

| 1,125,754 | France | Nov. 7, 1956 |